Sept. 26, 1950   H. F. GROEBE   2,524,012
POWER BOOSTED MASTER BRAKE CYLINDER IN WHICH BOOSTER
FLUID IS APPLIED UPON MOVEMENT OF THE CYLINDER
Filed Dec. 6, 1946   2 Sheets-Sheet 1

INVENTOR.
HAROLD F. GROEBE
BY Edwin Coates
ATTORNEY

Patented Sept. 26, 1950

2,524,012

UNITED STATES PATENT OFFICE 2,524,012

POWER BOOSTED MASTER BRAKE CYLINDER IN WHICH BOOSTER FLUID IS APPLIED UPON MOVEMENT OF THE CYLINDER

Harold F. Groebe, Los Angeles, Calif., assignor to Douglas Aircraft Company, Inc., Santa Monica, Calif.

Application December 6, 1946, Serial No. 714,497

15 Claims. (Cl. 60—54.6)

This invention relates to hydraulic brakes and is particularly concerned with the energizing, or activating, means therefor. Although of considerable utility in aircraft brake systems, the present invention is by no means limited thereto in its field of employment, since its principle can be substantially equally well employed in conjunction with hydraulic instrumentalities other than energizers or activators, and because the improved energizer can be utilized in hydraulic systems other than braking apparatus.

Heretofore, aircraft brakes were activated either by means of a hydraulic jack or master cylinder, utilized as the sole energy-control in the system; or by means of a power-valve also employed alone as the sole controller.

For light aircraft and those below the order of 10,000 pounds gross weight, it is accepted practice to utilize only a master brake cylinder and to employ it for all braking purposes since these devices are dependable, are of a lesser weight than correspondingly effective power brake-valves and, incorporating emergency-usable fluid reservoirs, do not necessitate the inclusion of auxiliary adjuncts to furnish power upon failure of the regular hydraulic pressure. If the craft has a gross weight lying approximately between the order of 10,000 pounds and 20,000 pounds, however, master cylinders are satisfactory only for the purpose of normal braking and for use in taxiing and other ordinary ground operations. They impose an excessive strain upon the pilot if employed in an attempt to maintain the craft stationary against a static thrust. In the case of aircraft having a gross weight exceeding 20,000 pounds, master cylinders are unsatisfactory for any useful purpose and a relatively bulky and heavy power brake-valve, necessitating the employment of weighty pneumatic adjuncts to meet emergencies, must be employed instead.

The present invention provides a power-multiplied brake activator or energizer which, although combining the functions of both previous types and giving rise to all the advantages of these types, incorporates few if any of their concomitant disadvantages. In addition, it effectuates certain results not achievable by either of the foregoing types of energy-controllers.

Primarily, the present invention augments the power ratio of conventional brake activators that is obtainable from a given fluid source, enabling increase of this ratio from the conventional 1:1 to any desired multiple of power. This augmented power, moreover, is achieved by means of a toe force less than that hitherto required to effect a given application of power with a master cylinder or power valve of comparable size. At the same time, the activator incorporates the direct responsivity and complete reliability of the ever-dependable master brake cylinders. The device is relatively light and compact, weighing less than the ordinary power brake-valve and pneumatic emergency adjunct heretofore employed on an airplane of the size for which one of the present devices is suitable. It is hence well adapted for employment as standard equipment in the lightest types of airplanes. However, since it embodies the aforementioned automatic power-multiplying means enabling it to hold an airplane stationary against the maximum static thrust developable, the invention is equally well fitted for employment in airplanes in the aforementioned category that exceed 20,000 pounds in weight. One and the same fluid body is employed both for ordinary braking purposes and to meet emergencies. Hence, in the event of failure or diminution of the pressure-fluid supply, ordinary toe effort alone will develop sufficient force in the present energizer to brake the airplane for all purposes except, possibly, holding against maximum static thrust. For the latter purpose, it may be necessary to apply greater effort. In all uses, the device applies pressure-fluid to the brake-pistons with a multiplied force which rises in direct and linear proportion to the toe effort. Therefore, in all operations, the normal "feel" of the conventional braking system is preserved, enabling the pilot to retain the conventional foot technique in ground-handling the craft.

In one of its now-preferred constructional forms, the invention essentially comprises one compact hydraulic unit for each landing wheel, one of the units being disposed laterally adjacent each brake pedal hanger in the pilot's cockpit. Each unit consists of a body containing two vertically related, flow-interconnected chambers. The chambered body is pivotally suspended from the medial portion of a rotatable lever. The upper end of the lever is pivotally mounted on the brake pedal support rod, and its lower portion is bifurcated. One of the furcations consists of a leaf spring and the other furcation is rigid. The upper chamber includes a spring-loaded slide valve suitably connectible to a power-fluid source. The outer end of the slide is adapted to be contacted by the lower end of the leaf spring. The rigid furcation is adapted to oscillate in a slot in the upper portion of the cylindrical body to serve as a stop for the movable lever. The lower chamber essentially constitutes a hydraulic jack, consisting of a cylinder containing unpressurized fluid and a spring-loaded, brake-pedal operable master piston working therein and having a poppet valve in its head. The chamber also includes a port below the piston dually functioning for exit of piston-pumped fluid to the brake-pistons and for ingress of fluid bleeding back from the brake-pistons to the supply source. The fluid-body in the lower chamber serves both as an ordinary brake-application fluid source and as a reservoir for emergency brake-application.

Upon brake-application, the reaction of the piston-displacing force, acting through both the lever pivots and tending to align same, effects clockwise rotation of the lever. Consequently, the leaf spring is stressed forcibly against the slide, retracting same into its chamber and thereby uncovering the power fluid inlet port. At the same time, the piston-displacing force effects seating of the poppet in the piston-head. Since the lever is rotated in direct response to the toe force, the leaf spring urge effects compression of the coiled slide-spring in the same direct proportion. The leaf spring action is resisted by the hydrostatic pressure of the small amount of residual fluid trapped in the bottom of the upper chamber, to an extent sufficient to limit the slide movement and restrict the inlet opening, this residual fluid also applying back-pressure to the incoming fluid, the two influences together thus reducing, proportionally to the lever moment, the pressure of the inlet fluid. Hence, the energizer is rendered substantially independent of surges and of source-pressure limits, thereby being adapted for employment with pressure-sources varying widely as to constancy and limits. Since the hydrostatic back-pressure and the coiled spring acting on the inside of the valve-slide tend to urge same increasingly outwardly as the pressure and volume of the inlet fluid accumulate therein, the slide-valve first is opened inwardly in the controlled manner aforedescribed, and then, after admitting a pressure proportional to brake-pedal depression, automatically moves outwardly into the neutral position, closing the inlet port until the brake-pedal is again depressed. It is hence impossible for a small toe effort to effect such a disproportionately large admission of fluid onto the piston as would cause the brakes to lock. The "boost" force bears a direct proportion to the leaf spring rate: the stiffer the leaf spring, the greater the boost. The boost ratio may be altered as desired by changing the leaf spring rate and/or the horizontal distance between the pivots on the lever. The braking effect and the brake pedal reaction will vary in direct linear proportion to the force exerted on the brake-pistons by the activator and the conventional "feel" of the brakes will therefore be preserved. Since the master piston is concurrently jacking the master cylinder-fluid to the brake pistons, the aforedescribed application of pressurized power-fluid onto the piston greatly augments or "boosts" its force and multiplies the power ratio of the device by a large factorial constant, this ratio being, for aircraft purposes, of the order of 3½ to 1 or greater.

Releasing the toe pressure on the brake-pedal permits the piston spring to retract the piston, and the upward movement of the piston effects unseating of the poppet in the piston. Substantially concurrently, the slide-biasing spring is thereby enabled to extend the slide to a position where it both closes the system-pressure inlet port and opens the return port, enabling the entire brake system to bleed back to the supply reservoir, and conditioning the controller and the rest of the system for the next brake-application.

This embodiment of the foregoing concepts is illustrated in the accompanying drawings, and described more in detail hereinafter, but merely to exemplify or elucidate the invention and not to delimit same. It is therefore to be understood that the invention by no means consists solely of the form depicted and described, being in fact capable of incorporation in any construction lying within the scope of the accompanying claims.

Figure 1:
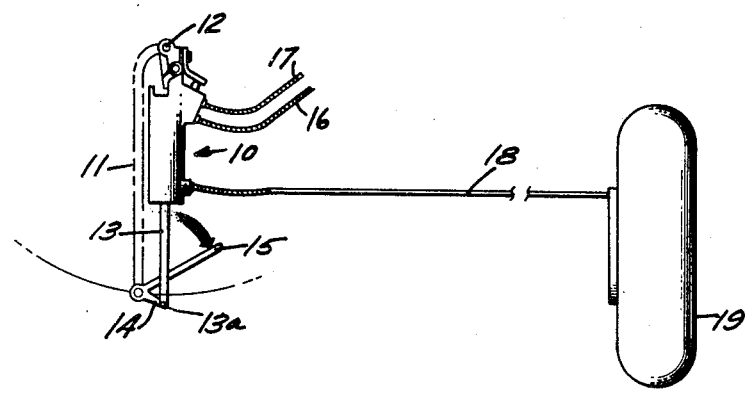
Figure 1 is a somewhat diagrammatic view of a braking system incorporating the invention, with the parts thereof in the inactive condition.
Figure 3:
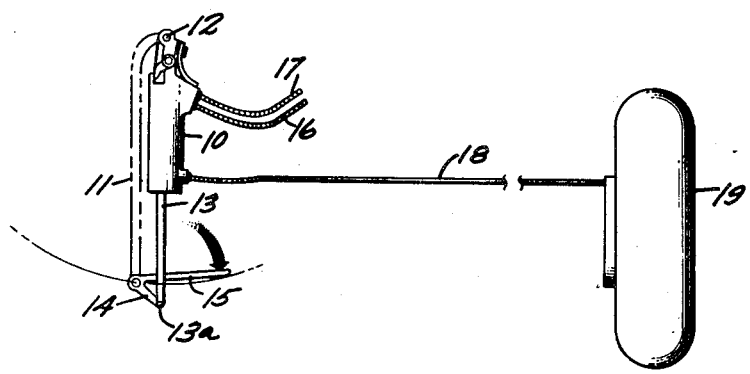
Figure 3 is a view similar to that of Figure 1, showing the parts in their active positions.
Figure 4:
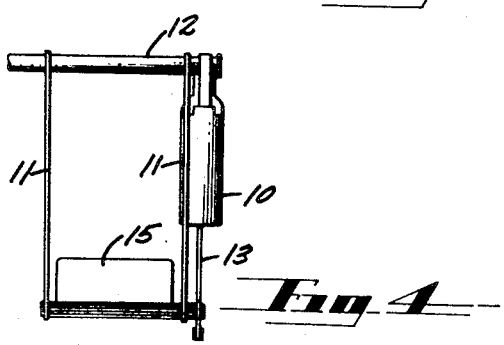
Figure 4 is a front elevational view of the brake actuator illustrated in Figure 1.

The brake system shown in the drawings includes a pair of control units 10, one of the units being mounted laterally adjacent each brake pedal hanger 11 in the cockpit on a transverse brake pedal support rod 12. Protruding from each unit is a piston rod 13 pivotally connected at a point 13a on its lower end to a brake pedal crank-arm 14. The brake pedal 15 is mounted in the usual manner on the brake pedal hanger 11, which in turn is revolvably mounted on the brake pedal support rod. An inlet conduit 16 leads from the hydraulic pressure system of the aircraft to each hydraulic unit and a conduit 17 returns therefrom to the pressure system. A conduit 18 extends from the exit, or pressure-applying, portion of the unit to the brake-applying piston of the adjacent landing wheel 19.

Figure 2:
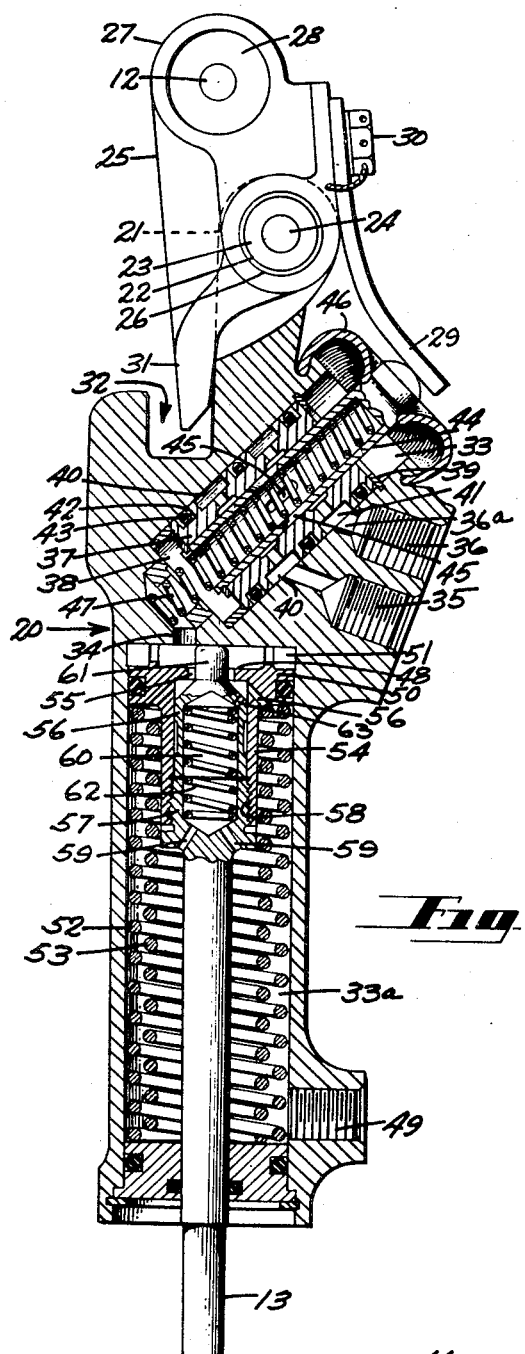
Figure 2 is a vertical, substantially medial, sectional view of the present power-multiplied controller or brake-actuator.

As shown in detail in Figure 2, each control unit 10 comprises a cylindrical body 20 terminating upwardly in a pair of parallel ears 21 suitably apertured as at 22, for the passage therethrough of a needle bearing 23, through which passes a connecting bolt 24. A lever 25 is interposed between the ears and bears an apertured boss 26 through which the bearing and bolt are adapted to pass. The upper end of the lever bears a bossed aperture 27 containing a needle bearing 28 through which passes the brake pedal support rod 12. A flat leaf spring 29 is attached to one of the longitudinal faces of the lever, as by a bolt 30 or the like. The lever terminates downwardly as a rigid detent 31, adapted to oscillate in a slot 32 in the upper end of the cylindrical body 20.

The cylindrical body includes two vertically separated cylindrical chambers, 33 and 33a, the upper and smaller one, 33, extending diagonally of the body and being flow-connected to the lower and larger chamber 33a by means of two passages 34 disposed on opposite sides of the diametral section shown. The upper chamber communicates near its inner end with an inlet port 35 connected to pressure inlet conduit 16, and with an outlet port 36 which is connected to pressure outlet conduit 17. The upper chamber includes mounted coaxially thereof, a sleeve 37 which is spaced from the bottom of the chamber by a spacer ring 38, and is held in place in the chamber by a stop ring 39. The sleeve 37 includes an annular inlet passage 40, and longitudinally spaced therefrom, an annular outlet passage 41.

The sleeve also bears a plurality of annular sealing grooves 42, each containing a sealing ring 43. Mounted coaxially of the sleeve is a hollow cylindrical valve slide 44 which bears, substantially medially of its length, a series of axially elongate, circumferentially spaced ports 45. The outer, closed end of the slide valve protrudes a substantial amount beyond the adjacent face of the body 20. The outer end of the chamber 33 is sealed fluid-tightly by means of a sealing boot 46. The slide valve contains a helical expansion spring 47 seated at one end in the chamber and bearing at its other extremity against the closed end of the valve slide. Normally, that is, when the unit is in the inactive position shown in Figure 2, the slide valve is biased outwardly against the resistance of the yieldable leaf spring by this helical spring alone, and without the aid of hydrostatic pressure, in order to establish communication between ports 45 and outlet port 36 and outlet channel 36a.

The lower chamber contains a piston 48 adapted to be reciprocated therein against fluid thereunder by brake pedal force applied to the piston rod 13. The wall of the chamber includes a port 49 which constitutes both an outlet for the piston-pumped fluid and an inlet for fluid bleeding from the brakes through the unit to the system reservoir, as hereinafter explained. The piston includes a sealed head 59, bearing spacers 51, and operatively interposed between the head and the lower closed end of the chamber is a pair of helical, concentrically arranged springs 52 and 53, the normal function of which is to maintain the piston head in contact, by its spacer portions 51, with the uppermost surface of the lower chamber.

The lower face of the piston is enlarged downwardly in the form of a hollow cup 54 which is threaded internally at its lower end. The upper portion of the head includes a central port 55 and the body of the head bears lateral passages 56 extending from the upper end of the cup downwardly into communication with the fluid filling the chamber 33a. The upper end of the rod is enlarged as at 57 and is externally threaded as at 58 to mate the threads on the cup. The enlargement includes passages 59 extending laterally and downwardly therein and communicating the interior of the cup with the interior of the chamber 33a. A hollow poppet valve 60 is slidably mounted coaxially in the upper end of the cup and includes an extension 61 normally adapted to bear against the upper surface of the chamber whereby the poppet is normally forced downwardly against the urge of a helical spring 62 mounted coaxially in the poppet. Thus, the poppet normally occupies an unseated position, so that the ports 55 and 56 are normally open. A passage 63 is provided in the head of the poppet to allow the poppet to vent, or bleed air, so that it may easily be moved downwardly when the extension 61 contacts the chamber wall.

With the braking system in the inactive position depicted in Figure 1, the various parts of the unit occupy the positions shown in detail in Figure 2. That is to say, the unit is pendent vertically from the pivot 24 on the lever, which in turn hangs substantially vertically from its pivot 28 on the brake support rod. In the cylindrical body, the piston is in contact with the top of the lower chamber, forcing the poppet valve into unseated condition and clearing a passageway through the piston head from the lower chamber to the upper chamber. Bleeding of fluid from the brakes to the main reservoir is thereby permitted, since, at this time, the slide valve 44 protrudes extremely from the body, registering ports 45 and 36 so as to complete a channel from the brake-line to the system-return line. At this time also, it will be observed that the piston rod lies in vertical alignment with the upper, or lever-supporting pivot 12, while the lower or body-supporting pivot 24 lies laterally displaced from this line.

As soon as the brake-pedal is applied, the toe force effects downward deflection of the piston, since the pedal is connected to the piston rod by means of the crank 14. Concurrently with this deflection the reaction of the brake pedal force, acting axially upwardly through the lower chamber and through the pivots 24 and 12, tends to align these pivots, thereby setting up in lever 25 a clockwise torsion having a moment proportional to the horizontal distance between these pivots. The lever, being freely suspended at 12, may thus be rotated clockwise around the upper pivot until the detent 31 comes to rest against the leftward side of the slot 32 in the body 20. The rotation of the lever forcibly applies the leaf spring against the head of the valve slide, effecting retraction of the same, against both the slide reaction and the hydrostatic pressure of the trapped fluid. Partly because of the slide spring 47 and partly in consequence of the trapped fluid's reaction, the registration of the slide ports 45 with the channel 35 is quite effectively limited, thereby in effect restricting the inlet conduits. Registration of the inner end of the ports 45 with the outer portion of the ring 35 is thus effected to an extent sufficient to admit reduced fluid pressure into the slide valve. Ordinarily, depression of the brake pedal about one-quarter of its stroke is effective to open an inlet path into the valve slide sufficient to admit a pressure onto the top of the master cylinder piston which is adequate to apply the brakes. Thereupon, in order to prevent the full head of pressure at the source from building up onto the master piston head, the accumulated pressure inside the valve slide, aided by the reaction of the slide valve spring, becomes operative to urge the partially retracted valve slide outwardly against the resistance of spring 29 sufficiently to close off the inlet opening, thereafter immobilizing the valve slide in this closed, or neutral, position. If the aforesaid quarter-depression of the brake pedal is not sufficient to effect application of the brakes, the pedal is now depressed, say, a half-stroke, whereupon the valve slide is again retracted, but this time substantially twice as far as before, whereafter it automatically closes as aforedescribed, and so on until such pressure has been applied to the brake pistons as is sufficient to apply the brakes. The flow-controlling means are rendered independent of the magnitude of the source-pressure within certain reasonable limits, ranging in the present embodiment, for example, from 1000 p. s. i. to 3000 p. s. i. The unit is for this reason and others, eminently adapted for use with pressure sources varying somewhat widely as to pressures.

At the same time, the piston in the lower chamber undergoes downward displacement by virtue of the toe effort transmitted thereto, to effectuate application of the fluid therein to the brake piston in each wheel. The downward displacement of the piston lowers the poppet valve extension 61 out of contact with the top of the chamber, whereupon the spring 62 in the poppet and the fluid forced upwardly through passages 59 effect seating of the poppet in the piston head.

The port 55 is thereby closed, preventing the flow of fluid from the upper chamber into the lower chamber and from the lower chamber into the upper chamber. The vent ports 63 and 56, of course, remain open during this phase.

System pressure, initially reduced directly and linearly proportional to the toe force acting, through the lever and the leaf spring, on the slide and rising directly proportionally to the degree of application of the brake pedal, is thus directed against the closed upper surface of the piston. This proportioned flow of pressure fluid not only facilitates the displacement of the piston and lowers the toe force required to apply the brakes, but augments the pressure of the fluid exiting from the lower chamber through the port 49 to the brake applying piston in the wheel. In fact, in the embodiment shown, this action increments the pressure exerted on the brake-pistons by the brake-fluid to such an extent as to establish a power ratio between the pedal force and the brake energizing force of a value on order of 3 to 3½ to 1.

It will be seen from a consideration of the above that operation of the system will produce a "feel" through the brake pedal 15 which is substantially proportional to the total force applied to the brakes of the airplane. Referring to Figure 2, if the pilot applies a downward force through piston rod 13 equivalent to 20 lbs. per square inch in the fluid below the piston 48, for instance, the slide 44 will be operated to produce a fluid pressure above the piston of 60 to 70 pounds per square inch. Poppet 60 will be inserted just sufficiently to permit balancing of the pressures above and below the piston, but the continued application of pedal pressure will re-seat the poppet and thereafter the pressure beneath the piston will be greater than that above it by the amount of the pedal force. Consequently, the fluid pressure at the wheel brakes, in the instance given, will be 80 to 90 pounds, the pressure above the piston will be 60 to 70 pounds, and the pressure resulting from tension in the rod 13 will be about 20 pounds. This latter pressure, which is a small fraction of the pressure at the brakes, represents the "feel" which indicates to the pilot the extent of brake application. If the pedal pressure is increased to 25 or 30 pounds the other two pressures will be increased in substantially direct proportion. Therefore the "feel" is always substantially directly proportional to the braking force.

Release of the toe pressure on the brake pedal allows the piston retracting springs 52 and 53 to retract the piston upwardly until the spacers 51 contact the upper wall of the lower chamber. The poppet extension 61, now also contacting this wall, forces the poppet downwardly sufficiently to open the port 63, enabling fluid bleeding from the brake line to exit upwardly through port 55 into the upper chamber 33 through the ports 34. Concurrently, the body and the lever having returned to their neutral or inactive vertical positions, the leaf spring stress is diminished to such an extent as to enable the slide spring to urge the slide outwardly again into the position shown in Figure 2. As a consequence, the system pressure inlet ports are closed and the system return ports are opened, enabling the fluid admitted to the upper chamber from the lower chamber and from the brake line to bleed back to the reservoir or to the system return.

In the event that the fluid pressure source to which inlet port 30, Figure 2, is connected fails or becomes inoperative for any reason, the system is still capable of emergency operation by direct manual force. In such case no boost pressure is available for application to the upper surface of piston 48, but as soon as it is lowered a short distance the poppet 60 will close and trap the fluid remaining below the piston. The downward force exerted on rod 13 by the pilot will then be translated into fluid pressure in the lower part of the cylinder, which pressure is transmitted through port 49 to the pistons of the braking mechanism. The system then operates as an unboosted straight hydraulic brake system.

I claim:

1. A fluid-force applying unit, comprising: a body movably mounted on a support and including a hydraulic master-cylinder containing a piston operable to apply fluid pressure to a remote point; said body being movable in response to a force transmitted to it by actuation of said piston; a pressure-fluid flow and return path passing through said body adjacent the force-initiating end of said cylinder and communicating with said piston; means in said body for controlling the flow in said path; and means operatively associated with said flow-controlling means and with said body and adapted to be actuated by the movement of said body under the mechanical force applied to said master cylinder by said piston to actuate said flow-controlling means so as to admit fluid onto said piston, whereby to augment the master cylinder effort.

2. A fluid-force applying unit, comprising: a body including a chamber having an exit port and containing a supply of fluid and a piston operable thereagainst by an operator to pressurally apply said fluid through said port to an external point of application; an external source of pressure fluid flow-connected with said body at a location apart from said chamber; valve means in said location adapted to establish communication between said pressure-fluid and the head of said piston; and means for supporting said body, said means including a portion operatively associated with said valve means and being adapted for activation by the piston through said body upon development of pressure in said chamber to open said valve, whereby to multiply the energy of the fluid exiting through said port while minimizing the operator effort requisite.

3. A fluid-force applying unit of the type including a pedal for operating same, and comprising: a body including an exit-ported cylinder containing a supply of fluid and a piston operable to pressurally supply said fluid extraneously; flow-controlling means in the body operatively associated with an external source of power-fluid and adapted to communicate said source with the piston head; and means for suspending said body from a support and having a portion operatively associated with said flow controlling means, said suspending means being adapted to be actuated by the external force applied to the piston in linear proportion to said force so as to actuate said flow-controlling means and admit said power-fluid onto said piston in direct proportion to the operator effort, whereby to augment the energy of the fluid exiting from said port while preserving the conventional "feel" of said operating pedal.

4. A fluid-force applying unit, comprising: a body movably mounted on a support and including a hydraulic master-cylinder containing a piston operable to apply fluid pressure to a remote point; response to a force transmitted to it by actuation of said piston; a power-fluid flow and return path passing through said body adjacent the force-initiating end of said cylinder; means in said body for controlling the flow in said path; means operatively associated with said flow-controlling means and with said body and adapted to be actuated by the movement of said body under the mechanical force applied to said master cylinder by said piston so as to admit said pressure-fluid into said piston and augment the master cylinder effort, said flow-controlling means including an instrumentality for establishing a constricted flow-path at the entry end of said flow-controlling means so as to reduce below the pressure-fluid source pressure the pressure of the fluid applied to said piston, whereby to render said flow-controlling means substantially independent of the magnitude of said source-pressure and adapt said unit for use with power-fluid sources varying widely as to pressure.

5. A fluid-force applying unit, comprising: a body movably mounted on a support and including a hydraulic master-cylinder containing a piston operable to apply fluid pressure to a remote point; response to a force transmitted to it by actuation of said piston; a power-fluid flow and return path passing through said body adjacent the force-initiating end of said cylinder; means in said body for controlling the flow in said path; and means operatively associated with said flow-controlling means and with said body and adapted to be actuated by the movement of said body under the mechanical force applied to said master cylinder by said piston so as to admit said pressure-fluid onto said piston and augment the master-cylinder effort, said flow-controlling means including a ported-slide mounted in said path adjacent the inlet end thereof and resilient means interposed between said slide and said body so as to exert an opposing-reaction to the registration of said port and said inlet, whereby to restrict the size of the inlet portion of said path.

6. A fluid-force applying unit, comprising: a support, a lever pivotally suspended at the one end from said support; a pivot intermediate the ends of said lever and laterally offset from the first-said pivot; a body suspended from the second-said pivot and including an exit-ported chamber containing a supply of fluid and a piston operable thereon to pressurally apply same to a remote point; a pressure-fluid flow and return path passing through said body adjacent said chamber; and means in said path for controlling the flow in said path, said lever having a portion operatively associated with the last said means and being adapted to be actuated by the piston through said body upon development of pressure in said chamber to cause said portion to operate said flow-controlling means so as to admit fluid onto said piston.

7. A fluid-force applying unit, comprising: a body including an exit-ported chamber for containing a mass of fluid and a piston operable thereon to pressurally apply same extraneously; a support; a lever pivoted to said support; a pivot on the lever for supporting said body, the last-said pivot being offset laterally from the line joining the first said pivot and the axis of said body; fluid-controlling means in said body adjacent said chamber operatively associated with a source of pressure fluid and adapted to be actuated by said lever to admit said pressure fluid onto said piston; and means for displacing the piston so as to produce a force directed co-axial with said chamber and eccentric to the pivot carried by said lever and thereby apply a rotative moment to said lever in direct proportion to the piston-operating load, whereby to admit fluid onto said piston and power-boost same as a linear function of said piston-operating load.

8. A fluid-force applying unit, comprising: a body including at the one end a slot defining a double-abutment, and having a ported chamber at the other end containing a mass of fluid and a piston displaceable for pressurally applying said fluid extraneously; a support adjacent the slotted end of said body; a bifurcated lever pivoted at the one end to said support, said pivot normally lying in alignment with the axis of said chamber, one of said furcations being rigid and adapted to operatively bear against the respective abutments of said slot, and the other of said furcations being resilient and adapted to bear proximate the opposite side of said body; a pivot near the other end of said lever for suspending said body and lying intermediate said furcations and laterally offset from the line joining the first-said pivot and the axis of said chamber; a pressure-fluid path leading through said body adjacent the pressure-initiating end of said chamber; fluid-control means in said path and adapted to be biased by said resilient furcation to admit fluid onto said piston; and means for displacing said piston so as to ultimately effect rotation of said lever about the first said pivot to urge said furcation biasingly against said fluid control means.

9. A fluid-force applying unit, comprising: a body movably mounted on a support and including a ported chamber containing a mass of fluid and a piston operable in the one direction in said chamber to pressurally apply said fluid extraneously and automatically retractable in the opposite direction to release said pressure; said body being movable in response to a force transmitted to it by actuation of said piston; means actuated by the movement of said body under the mechanical force applied to said master cylinder by said piston for admitting piston boosting fluid onto said piston; and means in said piston automatically actuatable by the forces induced by the respective movements of said piston for respectively establishing a bleeding channel for said fluid from said point of application through the piston head during said pressure releasing movement thereof and for preventing said piston boosting fluid and said mass of fluid from passing through said head during the pressure applying movement thereof.

10. A fluid-force applying unit, comprising: a body including a ported cylinder containing a supply of fluid and a piston operable to pressurally apply said fluid extraneously; and means operatively associated with a source of pressure fluid and operable by manual force applied to said piston and transmitted through said body upon development of pressure within said cylinder to apply said pressure fluid to the piston head, said means including a chamber in the body having an inlet port communicating with said source; a spring-loaded, ported slide mounted in said chamber to move with respect to said inlet and outlet ports; a lever mounted for rotation by the force applied to said piston, said lever having a resilient portion operably engageable with said slide; and means for operating said piston to effect rotation of said lever against said slide so as to effect registration of said slide port with said inlet port.

11. A power-boosted master brake cylinder assembly, comprising: a lever bifurcated at its one end and adapted to be pivotally suspended from a fixed structure by its opposite end, one of said furcations being rigid and the other being resilient; a pivot intermediate the ends of said lever and offset laterally from the first-said pivot; a body suspended from said second pivot and including an upper chamber and a lower chamber, the upper chamber including in inlet port and an outlet port for pressure fluid; and a spring loaded ported slide mounted therein and engaged by said resilient furcation, the lower chamber communicating with the upper chamber and including a port exiting to the brakes, a mass of fluid and a piston operable to pressurally apply said fluid extraneously and concurrently to apply its operating reaction through the second said pivot to effect rotation of said lever so as to urge said resilient furcation against said slide, whereby to at least partially register the port in said sleeve with said inlet port and effect augmentation of the piston effort.

12. In a hydraulic instrumentality including a main fluid-force applying component: a member adapted at the one end to be pivotally suspended from a fixed point and having a pivot near the other end for said component; a detent extending longitudinally of one side of the other end of said member; a resilient member extending longitudinally of the opposite side of said other end of said member; a chamber in the upper portion of said component, said component including inlet and outlet means for communicating said chamber with an external source of pressure fluid, and said chamber including an outlet for communicating same with the fluid-force applying portion of said component; a ported slide-valve disposed intermediate the first said inlet and outlet means, the bottom of said chamber and the inner end of said slide-valve defining an inlet-fluid-trapping space active upon the slide of said slide-valve, a portion of said slide extending into contact with said resilient member for retraction of the slide thereby, to effect registration of said port with said inlet means, upon creation of sufficient force-reaction in said component passing through said pivots.

13. A fluid-force applying unit, comprising: a body including a ported cylinder containing a supply of fluid and a piston operable to pressurally apply said fluid extraneously; said body being movably mounted on a support and being movable in response to force transmitted to it by actuation of said piston; and means actuated by movement of said body with respect to its support to supply booster fluid to said piston.

14. A fluid-force applying unit, comprising: a body including a ported cylinder containing a supply of fluid and a piston operable to pressurally apply said fluid extraneously; a support; a link pivotally mounted on said support; said body being pivotally mounted on said link and rotatable with respect thereto in response to force transmitted to said body by actuation of said piston; and means actuated by relative rotation of said link and said body to supply booster fluid to said piston.

15. A fluid-force applying unit, comprising: a body including a ported cylinder containing a supply of fluid and a piston movable coaxially in said cylinder in one direction in response to the application of manual force to pressurally apply said fluid extraneously; a support; a link pivotally mounted on said support; said link being pivotally mounted on said support at a point eccentric to the axis of said cylinder; resilient means urging said link to an angular position in which its pivotal connection to said support lies substantially on the axis of said cylinder; said angular position being modifiable by axial force on said cylinder produced by manual force applied to said piston; and valve means actuatable by modification of said angular position to supply booster fluid to said piston.

HAROLD F. GROEBE.

REFERENCES CITED

The following references are of record in the file of this patent:

UNITED STATES PATENTS

| Number | Name | Date |
|---|---|---|
| 1,472,801 | Loughead | Nov. 6, 1923 |
| 1,604,545 | Bragg | Oct. 26, 1926 |
| 1,903,973 | Boughton | Apr. 18, 1933 |
| 1,997,062 | Huffman | Apr. 9, 1935 |
| 2,205,806 | Belenkij | June 25, 1940 |
| 2,328,684 | Schnell | Sept. 7, 1943 |